(12) United States Patent
Vladimerou et al.

(10) Patent No.: US 12,346,679 B2
(45) Date of Patent: Jul. 1, 2025

(54) SYSTEMS AND METHODS FOR UPDATING VEHICLE SOFTWARE

(71) Applicant: Toyota Motor Engineering & Manufacturing North America, Inc., Plano, TX (US)

(72) Inventors: Vladimeros Vladimerou, Whitmore Lake, MI (US); Gregg J. Overfield, Canton, MI (US); Drew Cunningham, Superior Township, MI (US); John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 435 days.

(21) Appl. No.: 17/374,306

(22) Filed: Jul. 13, 2021

(65) Prior Publication Data

US 2023/0017403 A1    Jan. 19, 2023

(51) Int. Cl.
*G06F 8/65* (2018.01)
*G06F 8/71* (2018.01)
(Continued)

(52) U.S. Cl.
CPC .................. *G06F 8/65* (2013.01); *G06F 8/71* (2013.01); *H04W 4/40* (2018.02); *H04W 84/18* (2013.01)

(58) Field of Classification Search
CPC .............. G06F 8/65; G06F 8/71; H04W 4/40; H04W 84/18
See application file for complete search history.

(56) References Cited

U.S. PATENT DOCUMENTS 10,346,613 B2 *  7/2019  Djabarov .................. G06F 9/44
10,489,132 B1 * 11/2019  Bloomcamp ............. G06F 8/65
(Continued)

FOREIGN PATENT DOCUMENTS

| CN | 107809748 A | 3/2018 |
| KR | 20150085898 A | 7/2015 |
| WO | 2019061943 A1 | 4/2019 |

OTHER PUBLICATIONS

Mozilla, Range (Published Jun. 6, 2021) retrieved from https://web.archive.org/web/20210605060853/https://developer.mozilla.org/en-US/docs/Web/HTTP/Headers/Range on Mar. 16, 2024 (Year: 2021).*

(Continued)

*Primary Examiner* — Lewis A Bullock, Jr.
*Assistant Examiner* — Theodore E Hebert
(74) *Attorney, Agent, or Firm* — Christopher G. Darrow; Darrow Mustafa PC

(57) ABSTRACT

Systems, methods, and other embodiments described herein relate to updating vehicle software by using additional connectivity from an alternate device. In one embodiment, a method includes initiating a download from a first point and a second point within a software package by a communication module associated with a vehicle and an alternate device. The method also includes, responsive to comparing progress points of the download between the communication module and the alternate device, adapting the download according to the progress points and network connectivity by the communication module to complete the download, the first point and the second point being opposing ends within the software package.

20 Claims, 5 Drawing Sheets

(51) Int. Cl.
*H04W 4/40* (2018.01)
*H04W 84/18* (2009.01)

(56) References Cited

U.S. PATENT DOCUMENTS

| | | | |
|---|---|---|---|
| 11,422,792 B2* | 8/2022 | Brugman | H04L 9/3239 |
| 2004/0172476 A1* | 9/2004 | Chapweske | H04L 67/1008 |
| | | | 709/240 |
| 2018/0108186 A1* | 4/2018 | Lin | G06F 8/654 |
| 2018/0113703 A1 | 4/2018 | Tschache | |
| 2019/0163537 A1* | 5/2019 | Senapati | H04H 20/91 |
| 2019/0281052 A1* | 9/2019 | Lekkas | H04L 9/14 |
| 2020/0174781 A1* | 6/2020 | Buecherl | G06F 8/654 |
| 2020/0348923 A1* | 11/2020 | Mezaael | G06N 5/04 |
| 2021/0109745 A1* | 4/2021 | Brugman | G06F 8/656 |
| 2021/0224056 A1* | 7/2021 | John | G08G 1/096838 |
| 2022/0156054 A1* | 5/2022 | Thomasma | H04L 67/34 |
| 2023/0017403 A1* | 1/2023 | Vladimerou | H04W 24/02 |

OTHER PUBLICATIONS

Chris Teague, "How to update Android Auto," Digital Trends, Mar. 11, 2021, 5 pages, found at https://www.digitaltrends.com/cars/how-to-update-android auto/.

Projjal Gupta, "A decentralized approach towards secure firmware updates and testing over commercial IoT Devices," arXiv:2011.12052v1, Nov. 24, 2020, pp. 1-6.

Baza et al., "Blockchain-based Firmware Update Scheme Tailored for Autonomous Vehicles," 2019 IEEE Wireless Communications and Networking Conference (WCNC), 2019, pp. 1-7.

* cited by examiner

SYSTEMS AND METHODS FOR UPDATING VEHICLE SOFTWARE

TECHNICAL FIELD

The subject matter described herein relates, in general, to software updates, and, more particularly, to updating vehicle software using additional connectivity from an alternate device.

BACKGROUND

Vehicles include hardware, such as controllers, that a system can program using software updates. Vehicle manufacturers may sometimes update the software in a controller using an external network to reduce dealership visits. For example, a data communications module (DCM) in the vehicle may directly download a software update from a server using a cellular network for an electronic control unit (ECU) in a steering system. Such an operation may utilize an over-the-air (OTA) service provided by the server. However, using the external network and the OTA service may involve a costly subscription to a wireless service.

Moreover, a software update via OTA may abruptly cease when a vehicle turns off or loses connectivity. For instance, an electric vehicle may shut-down connectivity to save power during major and complex software updates. In addition, vehicle processors may have insufficient resources and power to manage complex software updates over a wireless network. Accordingly, vehicle connectivity and processing power pose challenges to efficiently and robustly perform software updates over an external network for controller programming.

SUMMARY

In one embodiment, example systems and methods relate to updating vehicle software using additional connectivity from an alternate device. In various implementations, a vehicle may lack reliable connectivity or computing resources to robustly perform software updates from a server via an external network. Furthermore, an update system may abruptly cease a download by a data communications module (DCM) when a vehicle turns off. For instance, the vehicle may turn off when parked causing a communication link for a firmware update to shut-down. Accordingly, systems in a vehicle may encounter difficulties at efficiently and robustly performing software updates for programmable controllers. Therefore, in one embodiment, an update system may use connectivity from an alternate device and a vehicle to download a software package from opposing points for subsequent assembly. Here, a point may be a data block in a set associated with the software package for a vehicle controller. In one approach, a mobile device using the update system may manage the download of data blocks representing the software package. The mobile device may download from the end point of the data blocks while instructing the vehicle to download from the starting point. This may continue until the update system on the mobile device determines all the data blocks are properly received between the two devices. As such, the update system may cause the alternate device to download in reverse, related to the starting point, from the end point regardless of a vehicle state (e.g. parked), thereby reducing disruptions from connectivity issues.

Moreover, the update system may adapt the download by comparing the starting and end point statuses according to network connectivity. For example, the download from the starting point may cease when the wireless access by the alternate device is more reliable than access by the vehicle. For installation, the update system may assemble the starting and end components of the software components once the alternate device or vehicle download respective portions to certain points. In this way, the update system may utilize the alternate device to robustly perform software updates by coordinating with the vehicle and using parallel downloads to ensure completion.

In one embodiment, an update system for updating vehicle software by using additional connectivity from an alternate device is disclosed. The update system includes a processor and a memory storing instructions that, when executed by the processor, cause the processor to initiate a download from a first point and a second point within a software package by a communication module associated with a vehicle and an alternate device. The update module also, responsive to a comparison of progress points of the download between the communication module and the alternate device, adapts the download according to the progress points and network connectivity by the communication module to complete the download, the first point and the second point being opposing ends within the software package.

In one embodiment, a non-transitory computer-readable medium for updating vehicle software by using additional connectivity from an alternate device and including instructions that when executed by a processor cause the processor to perform one or more functions is disclosed. The instructions include instructions to initiate a download from a first point and a second point within a software package by a communication module associated with a vehicle and an alternate device. The instructions also include instructions, responsive to a comparison of progress points of the download between the communication module and the alternate device, to adapt the download according to the progress points and network connectivity by the communication module to complete the download, the first point and the second point being opposing ends within the software package.

In one embodiment, a method for updating vehicle software by using additional connectivity from an alternate device is disclosed. In one embodiment, the method includes initiating a download from a first point and a second point within a software package by a communication module associated with a vehicle and an alternate device. The method also includes, responsive to comparing progress points of the download between the communication module and the alternate device, adapting the download according to the progress points and network connectivity by the communication module to complete the download, the first point and the second point being opposing ends within the software package.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented

DETAILED DESCRIPTION

Figure 1:
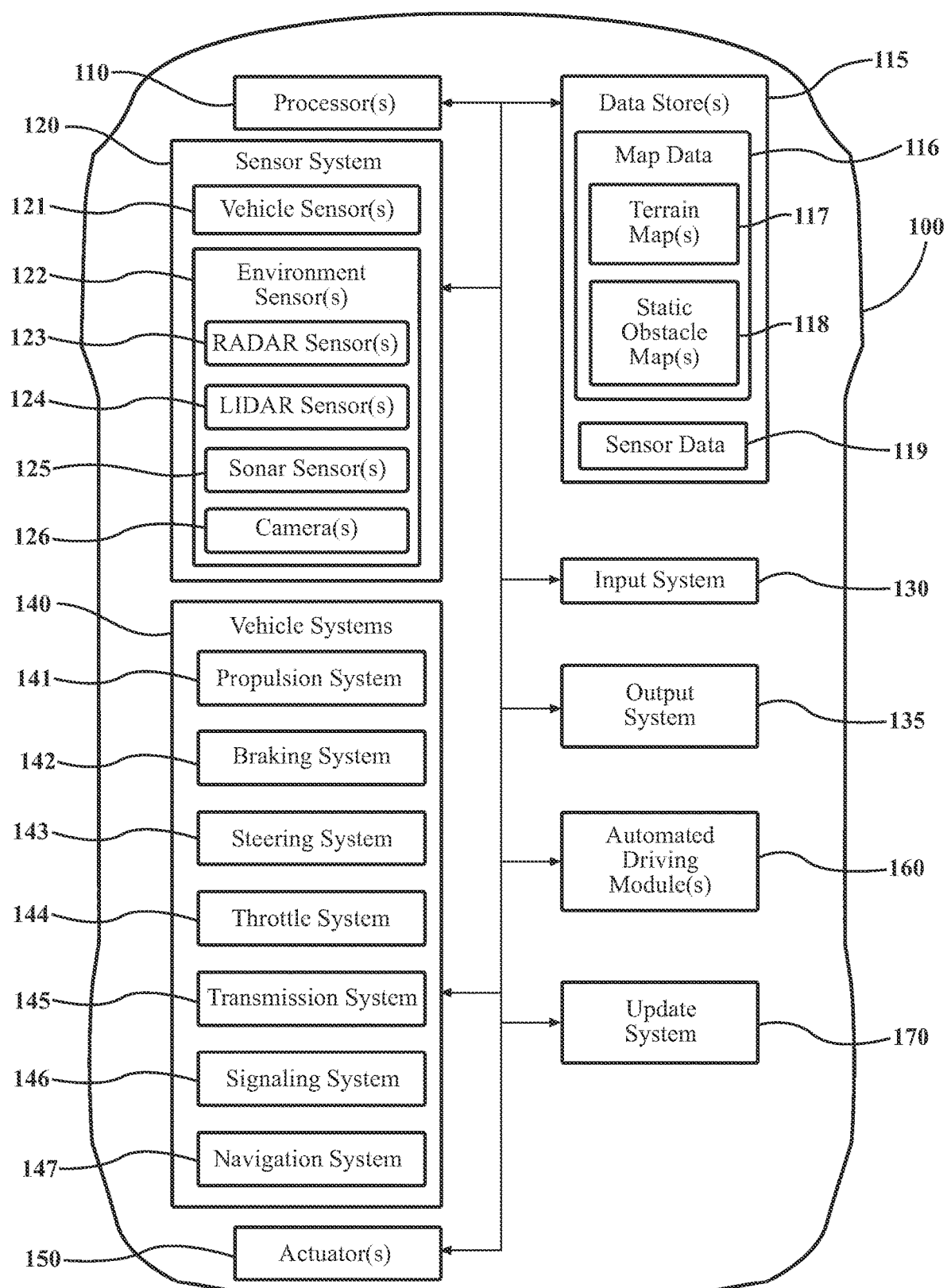
FIG. 1 illustrates one embodiment of a vehicle within which systems and methods disclosed herein may be implemented.

Systems, methods, and other embodiments associated with updating vehicle software by using additional connectivity from an alternate device are disclosed herein. An update system in a vehicle or alternate device may coordinate downloading data blocks of a software package from opposing points to mitigate download disruptions due to connectivity. The processing resources and connectivity of the alternate device (e.g. smartphone) may result in a faster and more reliable download of the software package. During the download, a point may be a data block in a set associated with the software package. As such, the opposing points may be the data blocks at the ends of the set that represent the starting point and the end point (i.e. last data block) of the download. Downloading from the starting or end points in parallel may ensure that the download continues regardless of connectivity problems, such as poor signal strength. The download may complete once the portions of the software package converge. In this way, convergence and completion of the software update may be ensured by one device downloading the software package in reverse, relative to the starting point, from the end point while another device (e.g. vehicle) concurrently downloads from the starting point.

Furthermore, in various implementations, a data communications module (DCM) of the vehicle and the alternate device may download respective portions from an original equipment manufacturer (OEM) server up to certain data blocks. In one approach, the alternate device may request a progress report from the DCM indicating progress points when in range of the vehicle using direct communications (e.g. Bluetooth, 802.11x, etc.). The alternate device may utilize the information regarding data blocks downloaded to determine whether to continue or cease the download, thereby preventing overlapping downloads. Moreover, the update system may complete the download when the vehicle or the alternate device receives all the data blocks from the OEM server for respective portions from the opposing ends. In one approach, upon completion or convergence, the alternate device may communicate the data blocks downloaded from the end point using a direct connection to the DCM(s). The DCM(s) in the vehicle may communicate, using a controller area network (CAN), the portions of the software package to an electronic control unit (ECU) for assembly and installation. In this way, the update system ensures that the update completes regardless of the download interruptions for the vehicle by having the alternate device concurrently download the back portion in reverse.

In addition, in various implementations, the progress points may be adapted by the update system according to the network availability of either device. For example, the update system may cease the download by the alternate device when the vehicle enters a connectivity hotspot, such as an 802.11x network. Accordingly, the DCM may download the remaining portion to the end point for download completion. In one approach, the update system may optimize the download according to signal strength, time of day, or quality of service (QoS) of network connectivity. In this way, the update system may cause the alternate device to download in reverse from the end point regardless of a vehicle state (e.g. parked), thereby reducing the impact of connectivity disruptions.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with improving software updates in a vehicle using additional connectivity from an alternate device.

The vehicle 100 also includes various elements. It will be understood that in various embodiments, the vehicle 100 may have less than the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an update system 170 that is implemented to perform methods and other functions as disclosed herein relating to improving software updates in a vehicle by using additional connectivity from an alternate device. For example, the alternate device may be an external or intermediate device such as a mobile computer.

Figure 2:
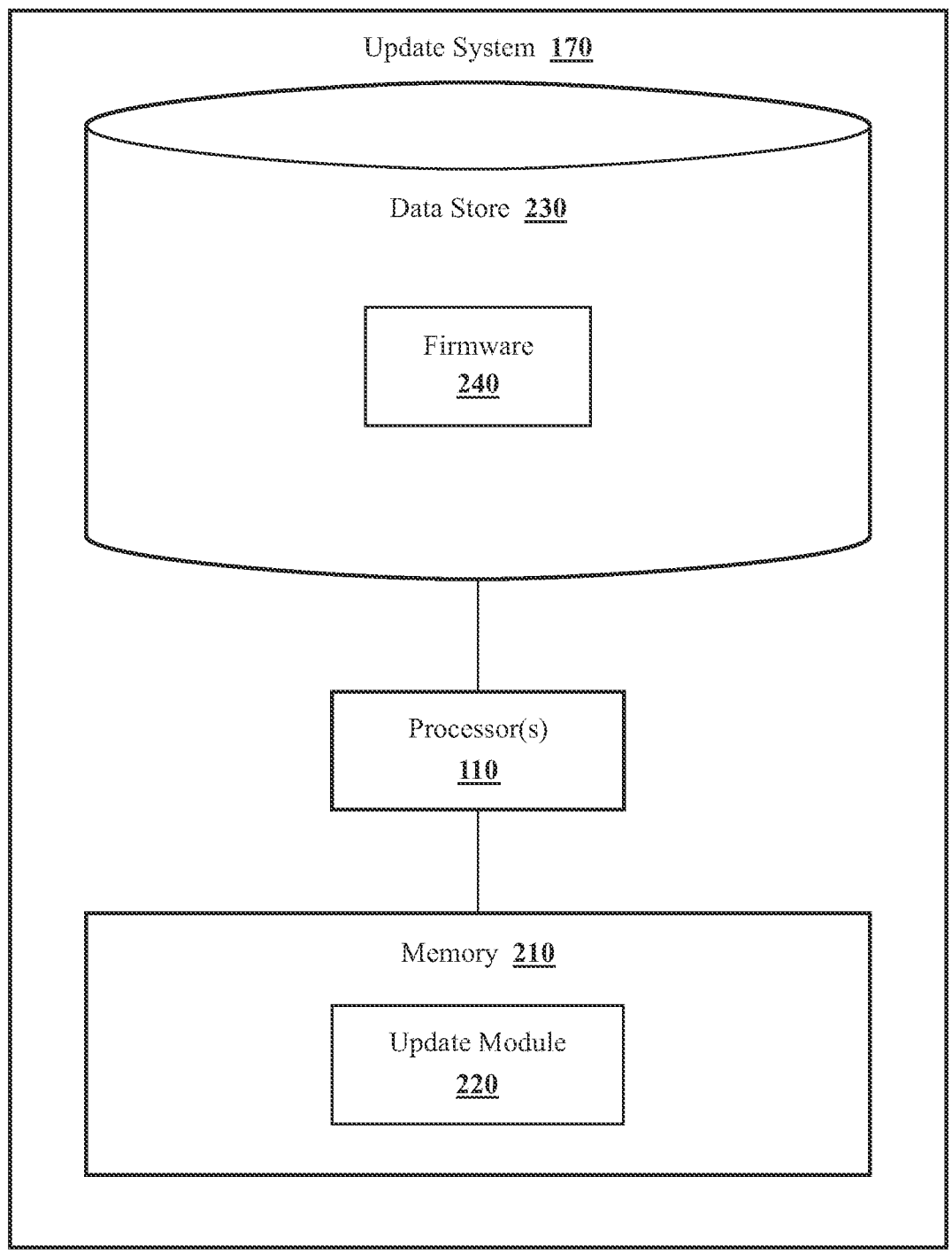
FIG. 2 illustrates one embodiment of an update system that is associated with updating vehicle software using an alternate device.

With reference to FIG. 2, one embodiment of the update system 170 of FIG. 1 is further illustrated. The update system 170 is shown as including a processor(s) 110 from the vehicle 100 of FIG. 1. Accordingly, the processor(s) 110 may be a part of the update system 170, the update system 170 may include a separate processor from the processor(s) 110 of the vehicle 100, or the update system 170 may access the processor(s) 110 through a data bus or another communication path. In one embodiment, the update system 170 includes a memory 210 that stores an update module 220. The memory 210 is a random-access memory (RAM), read-only memory (ROM), a hard-disk drive, a flash memory, or other suitable memory for storing the update module 220. The update module 220 is, for example, computer-readable instructions that when executed by the processor(s) 110 cause the processor(s) 110 to perform the various functions disclosed herein.

Moreover, in one embodiment, the update system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the update module 220 in executing various functions. In one embodiment, the data store 230 further includes the firmware 240 that is part of a software package downloaded by the update system 170. For instance, the software package may be a file containing machine code used to flash an ECU(s). As such, the firmware 240 may be used to update and program the operation of ECUs associated with one or more vehicle systems 140.

Figure 3:
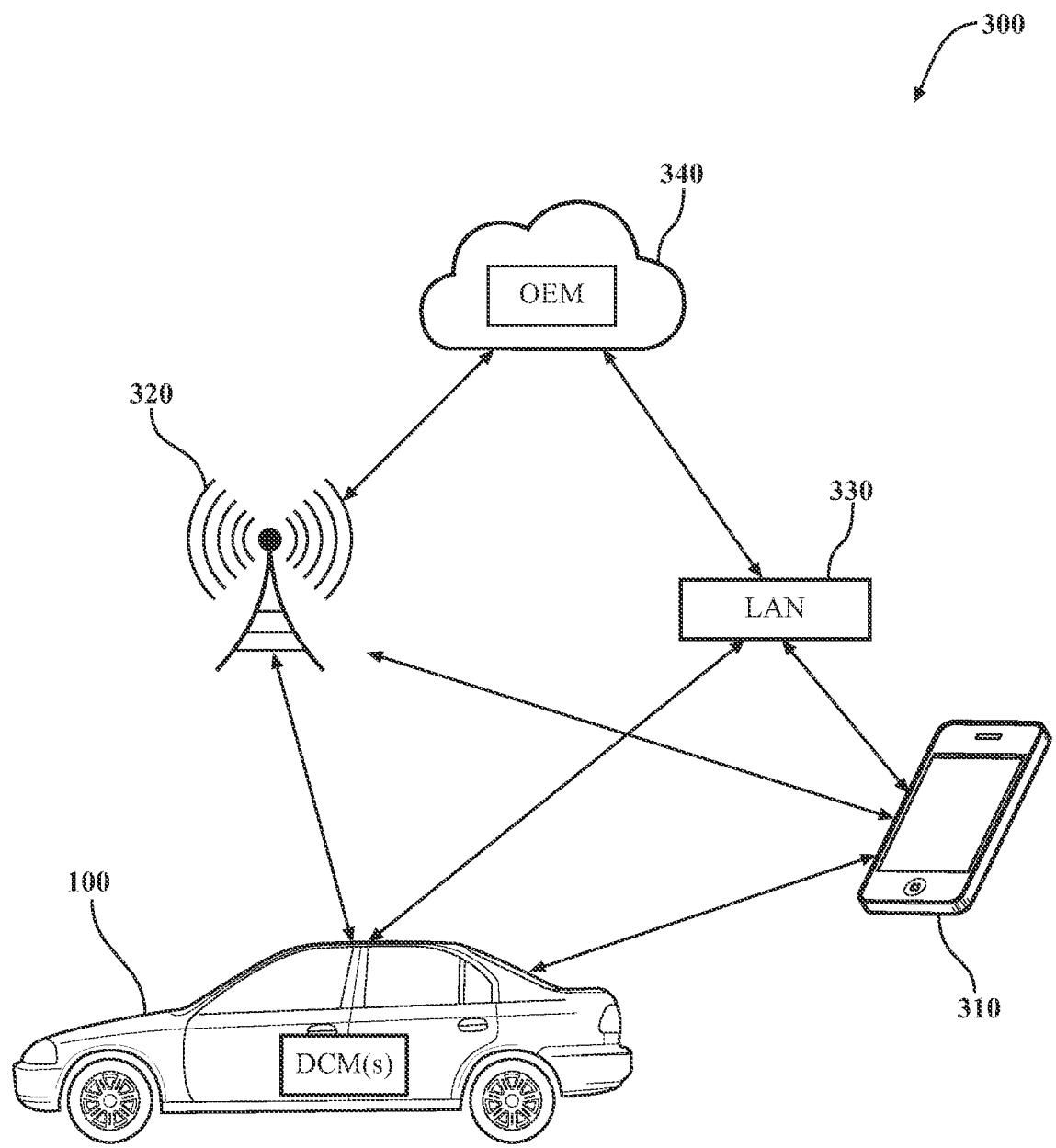
FIG. 3 illustrates an example of a vehicle and mobile device coordinating a download of a software package.

The update module 220, in one embodiment, is further configured to perform tasks related to downloading software packages or updates from a server (e.g. OEM server). For example, the update module 220 includes instructions that cause the processor 110 to download a software package divided into data blocks from a first data block as the starting point or a last data block as the end point. To this end, FIG. 3 illustrates an example 300 of the vehicle 100 and a mobile device 310 coordinating a parallel download of the software package. The vehicle 100 may include one or more communication modules, such as DCMs or communication ECUs, that connect to the wide area network (WAN) 320 and/or a local area network (LAN) 330 depending on network availability. In one approach, the WAN 320 may be a cellular or mobile network and the LAN a fixed wireless network (e.g. 802.11x). Similar to the vehicle 100, the mobile device 310 may connect to the WAN 320 and/or the LAN 330. In one approach, the mobile device 310 may be a smartphone, tablet, laptop, and so on that communicates with the vehicle 100 using Bluetooth, 802.11x, Wi-Fi, universal serial bus (USB), and so on connectivity.

In the example 300, either the vehicle 100 or the mobile device 310 may initiate a software update to concurrently download the firmware 240 in a software package from opposing points or ends. Prior to the initiation and download, the update system 170 may communicate over a CAN to determine firmware installed on ECUs in the vehicle 100. Correspondingly, the update system 170 may verify software versions through security procedures related to the initiation. For example, the update system 170 may receive a signed request by an ECU(s) for authenticating an update. The signed request may include a key, decryptable only by the OEM server 340, that identifies the DCM(s) individually. In one approach, the key may utilize the vehicle identification number (VIN) or other code negotiated with the OEM server 340 through a handshaking procedure for authentication.

In order to leverage alternate connectivity, the update system 170 may use two wireless services to download in parallel a software package from the OEM server 340 according to a starting point and an end point. For example, the DCM(s) in the vehicle 100 may receive the software package from the starting point that represents the beginning or the first data block of the download. In this way, the DCM(s) may function as a local server or provider for updating the ECU(s). Correspondingly, the mobile device 310 may start the download in reverse, relative to the starting point, from the end point of the software package. The update system 170 may coordinate the download of the two portions, between the vehicle 100 and the mobile device 310, from opposing ends until reaching completion or a certain convergence point. Upon completion or convergence, the mobile device 310 may communicate the portion downloaded using Bluetooth, 802.11x, USB, and so on connectivity to the DCM(s). The DCM(s) in the vehicle 100 may then communicate using a local network the two downloaded portions to the ECU(s) or another component in the vehicle 100 for assembly and installation. In this way, the update system 170 ensures that a software update completes regardless of download interruptions for the vehicle 100 by having the mobile device 310 download in reverse while the vehicle downloads from the starting point in parallel.

In various implementations, an application on the mobile device 310 may control the update system 170 for downloading the firmware 240. As such, the mobile device 310 and the DCM(s) may perform a handshake for authorization. The application may subsequently register with the OEM server 340 as a download target for software updates. The application may allow various controls for the software updates. For example, the application may set a frequency for checking updates on the OEM server 340 and prompt an operator accordingly. The application may also allow an operator to initiate the update through a prompt or utilize automatic downloads.

For further customization, the application may allow the operator to select specific ECUs on the vehicle 100 to update either manually or automatically. For security enhancements, the operator may also request a prompt before an update downloaded to the mobile device 310 is transferred to the DCM(s). In this way, the application running on the mobile device 310 may function as a virtual service for software updates by managing the download with the OEM server 340.

Figure 4:
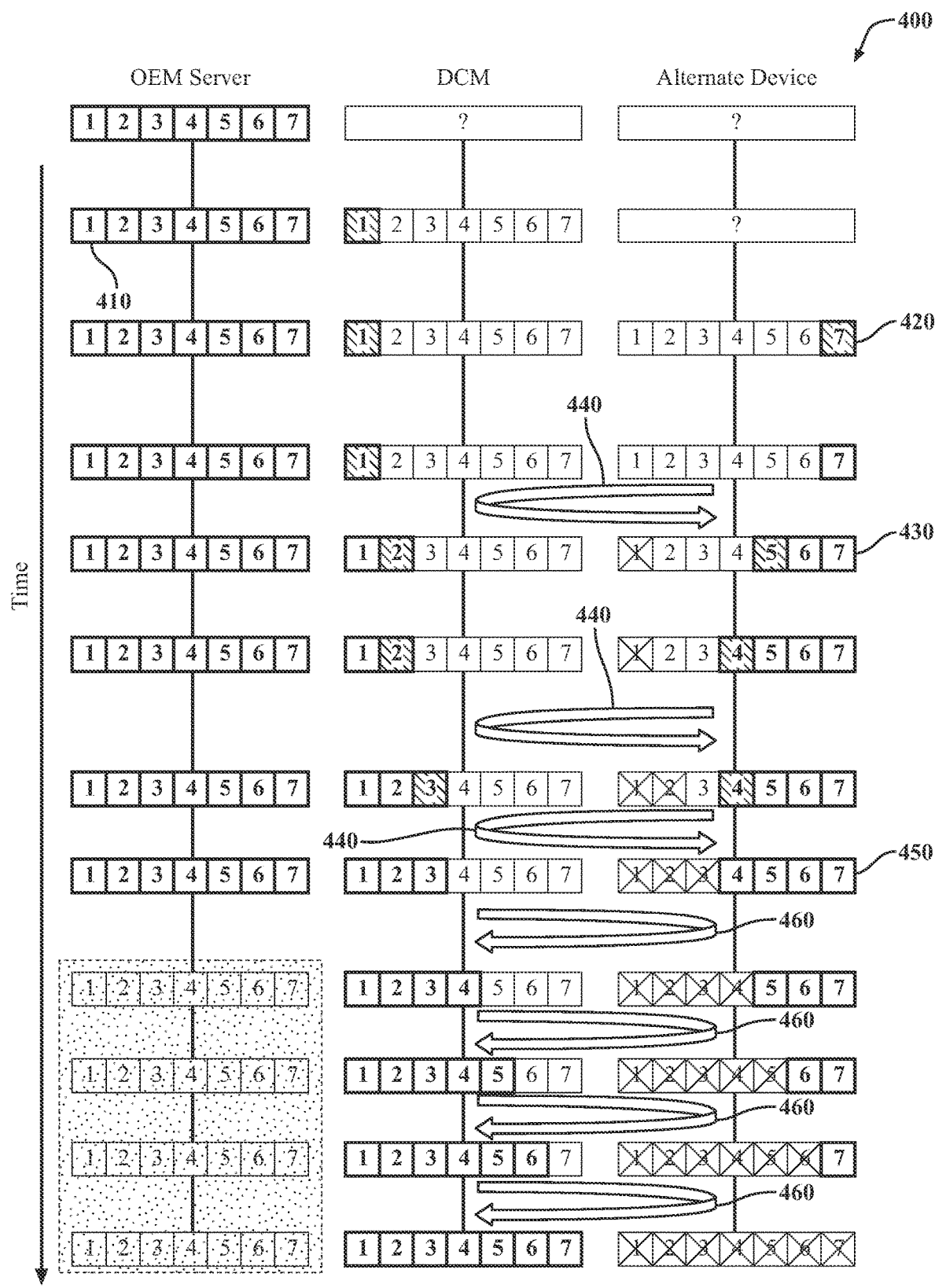
FIG. 4 illustrates an example of a vehicle and an alternate device adaptively coordinating a download in parallel associated with a software package.

Now turning to FIG. 4, an example of the vehicle 100 and an alternate device adaptively coordinating a download 400 associated with a software package is illustrated. An OEM server may segment a software package into seven data blocks, such as transmission control protocol (TCP) data blocks. Although seven data blocks are illustrated, the software package may be segmented into any number of data blocks. In one approach, the OEM server and the update system 170 negotiate to segment the software package according to processing resources, network services, network connectivity, and so on of the vehicle 100 and the alternate device. The alternate device may be an intermediate device such as a mobile computer that the update system 170 uses as an additional source for a software update to leverage processing resources or network connectivity. In other configurations, the alternate device may also be the primary source that downloads the software package from the starting point for the system to rely less on costly cellular services of the vehicle 100. Regarding download optimization, the update system 170 may also use a window size when using TCP associated with the number of data blocks for the download to maximize download speed. Accordingly, the download 400 may optimize load balancing to improve the delivery of the software package or the firmware 240 to the vehicle 100 with the alternate device.

In one approach, the update system 170 may configure the download such that the vehicle 100 and the alternate device start at opposing points or ends. For example, downloading from the starting or end points of the software package by the two devices may ensure that the download continues regardless of connectivity problems. Such issues may include poor wireless coverage or a state (e.g. off) associated with the vehicle 100. In addition, the update system 170 may allow the DCM to begin the download at a starting point and the alternate device at the end point to minimize coordination between the sides. The starting point may represent the first data block of the download. Correspondingly, the end point may represent the last data block of the download. During the download 400, as an example, the DCM may download up to data block three and the alternate device up to data block four. However, the update system 170 may configure or initiate the DCM and alternate device to download portions from the starting and end points to any progress points. In this way, the update system 170 may ensure download completion of the software package regardless of the state (e.g., off, parked, etc.) of the vehicle 100 that may interrupt the download 400 by leveraging additional connectivity.

At initiation, the update system 170 may coordinate a parallel download between vehicle 100 and the alternate device. For example, the update system 170 may instruct the DCM and the alternate device to download the software package up to a certain progress point to prevent or minimize overlap, such as from a lack of communication. However, as explained below the update system 170 may allow some overlap to ensure download completion by the convergence of the opposing ends. This configuration may also forego random or alternating downloads to reduce complexity. For additional efficiencies, the data blocks of the software package may also include a timestamp or expiration date to prevent installing stale data.

Once a download commences at time 410, the DCM may download the first data block of the software package. At time 420, the alternate device in parallel downloads starting at the last data block, in this case data block seven. The download 400 continues until at time 430 the alternate device requests the progress report 440 from the update system 170 and DCM when in range of the vehicle 100. The progress report 440 may indicate that data block one is downloaded by the DCM and the alternate device should continue downloading or indicate other information associated with progress points. In one approach, the alternate device may also transfer data blocks 6 and 7 using Bluetooth, 802.11x, Wi-Fi, USB, and so on connectivity to the DCM in the event that the update system 170 adapts or changes proportions for each side to download. For security, the data blocks 6 and 7 may also be signed according to the VIN or code associated with the DCM. Furthermore, additional progress reports or updates may occur between the DCM and alternate device when they are within a certain communication range.

When the alternate device is away from the vehicle 100 and/or DCM, the alternate device may download the software package up to a certain progress point or to the last known progress point associated with the starting point. The alternate device may do so from the OEM server using a WAN or LAN connection. In this way, the update system 170 may prevent duplicate downloads of data blocks.

In various implementations, the progress points may also be adapted according to LAN, 802.11x, Wi-Fi, and so on availability of the vehicle 100 or the alternate device. In one approach, the update system 170 may cease a download from the starting point or end point when either device connects to a LAN. For example, the update system 170 may cease the download 400 by the alternate device when the vehicle 100 enters a connectivity hotspot, such as an 802.11x network. Accordingly, the DCM may download the remaining portion to the end point for download completion. Furthermore, the update system 170 may optimize the download 400 according to signal strength, source, time-of-day, or QoS of LAN and WAN connectivity for either device.

At time 450, download completion may be reached when the DCM has data blocks 1-3 and the alternate device has data blocks 4-7. Subsequently, the DCM begins sequentially transferring data block 4 to data block 7 using Bluetooth, 802.11x, Wi-Fi, USB, and so on connectivity (460) from the alternate device when both devices are within range.

In various implementations, in the event that the alternate device is regularly out of the communications range of the vehicle 100 and the DCM is active, such as while driving or even with the engine off, the update system 170 may download as many data blocks as possible. In one approach, the download 400 may continue on the vehicle 100 even beyond the portion known by the update system 170 to be downloaded by the alternate device. For example, the update system 170 may download more data blocks by estimating future network speeds of the vehicle 100 and the alternate device. In another example, the update system 170 may determine that the alternate device will be unable to satisfy a target time for download completion. Accordingly, the update system 170 may adapt the parallel download from the opposing points or ends according to conditions associated with the alternate device, thereby ensuring download completion of the software package in the event of connectivity disruptions.

Figure 5:
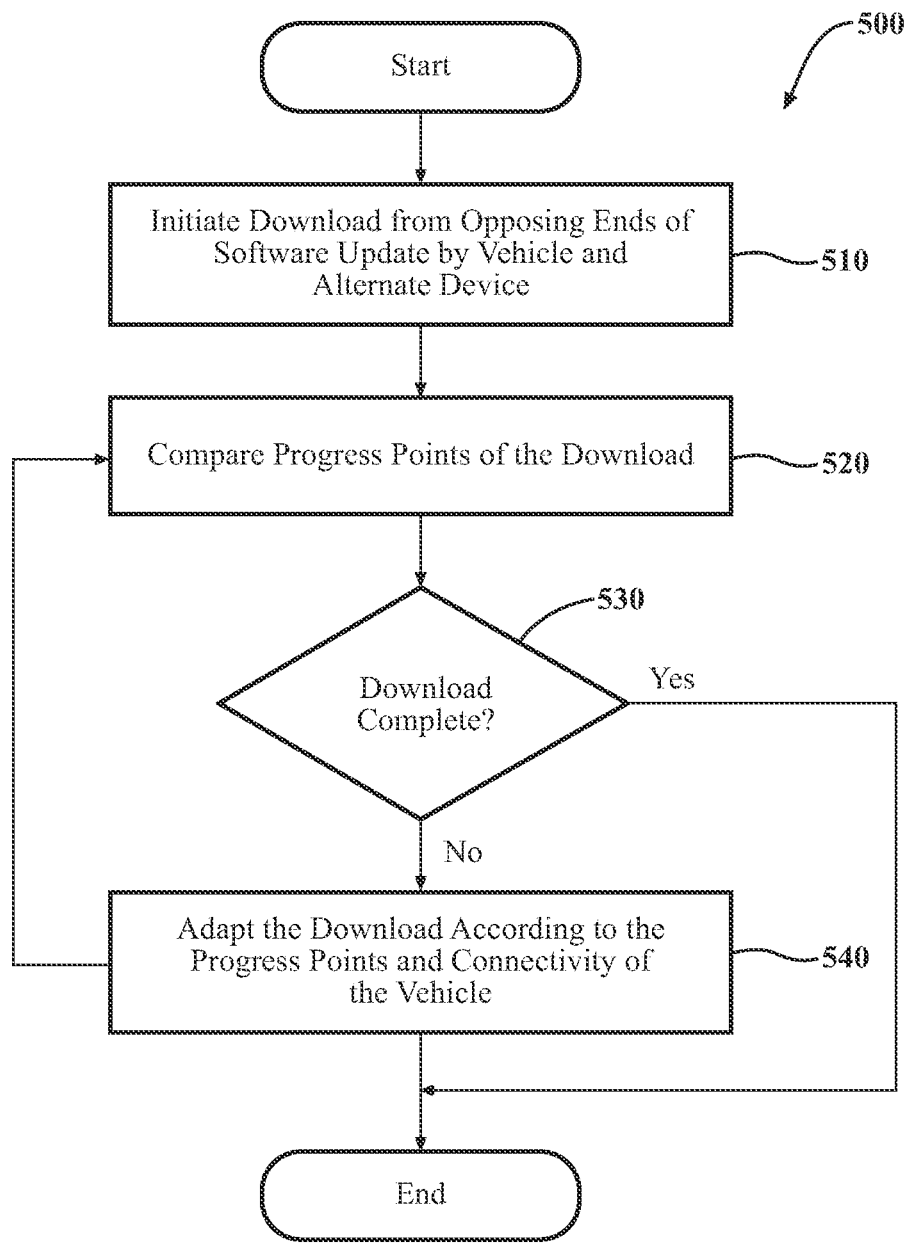
FIG. 5 illustrates one embodiment of a method that is associated with updating vehicle software using additional connectivity from an alternate device by downloading from opposing points or ends.

Additional aspects of updating software on the vehicle 100 will be discussed in relation to FIG. 5. FIG. 5 illustrates a flowchart of a method 500 that is associated with improving software updates in a vehicle using an alternate device. Method 500 will be discussed from the perspective of the update system 170 of FIGS. 1, and 2. While method 500 is discussed in combination with the update system 170, it should be appreciated that the method 500 is not limited to being implemented within the update system 170 but is instead one example of a system that may implement the method 500.

At 510, the update system 170 initiates a download from opposing ends of a software update by the vehicle 100 and an alternate device. The update system 170 may operate on the vehicle 100 to control the alternate device for the download. In one approach, the update system 170 may allow the DCM to begin the download for updating ECU firmware at a starting point and a smartphone (i.e. the alternate device) at the end point. Downloading from the starting or end points may ensure that the download continues by one device when connectivity disruptions, such as poor wireless coverage or vehicle state (e.g. turned off), hinders reception by another device. Furthermore, the configuration may also minimize coordination between the devices or sides. For the download structure, the starting point may represent the first data block of the download. Correspondingly, the end point may represent the last data block of the download. In this way, the update system 170 may ensure download completion of the data blocks regardless of the state (e.g., off, parked, etc.) of the vehicle 100 that may interrupt the download by leveraging parallel connectivity.

After initiation, at 520 the update system 170 compares progress points of the download. For example, the download continues until the alternate device requests and receives a progress report, from the update system 170 and DCM, when in range of the vehicle 100. The progress report may indicate the data blocks downloaded by the DCM or other information associated with progress points. The update system 170 may utilize the progress points to track the download for accounting or preventing overlapping downloads. In one approach, the alternate device may cease downloading the portion if the DCM downloaded beyond a predetermined data block.

At 530, the update system 170 determines whether the download is complete. As explained above, the vehicle 100 or alternate device may download each portion of the download up to a certain data block according to instructions from the update system 170. In one approach, the portion size of each side may be based on the processing resources or network connectivity of the vehicle 100. For further adaptations, the update system 170 may also optimize the download according to signal strength, source, time-of-day, or QoS of LAN and WAN connectivity of the two devices.

The download completes once the DCM or the alternate device receives all the data blocks from the OEM server for respective portions of the software package. In one approach, upon completion or convergence the alternate device may communicate the portion downloaded from the end point using Bluetooth, 802.11x, Wi-Fi, USB, and so on connectivity to the DCM(s). The DCM(s) in the vehicle 100 then may communicate using a CAN, Ethernet, and so on the portions of the software package to the ECU(s) or another component in the vehicle 100 for assembly and installation. Accordingly, the update system 170 ensures that the update completes regardless of download interruptions for the vehicle 100 by having the alternate device download in reverse while the vehicle downloads from the starting point in parallel.

At 540, the update system 170 adapts the download according to the progress points and connectivity of the vehicle 100 for incomplete downloads. In various implementations, the progress points may be adapted according to LAN, 802.11x, Wi-Fi, and so on availability of the vehicle 100 or the alternate device. In one approach, the update system 170 may cease a download from the starting point or end point when either device connects to a LAN. For example, the update system 170 may cease the download by the alternate device when the vehicle 100 enters a connectivity hotspot. Accordingly, the DCM may download the remaining portion from the end point for download completion. Similar to above, the update system 170 may also optimize the download according to signal strength, source, time-of-day, or QoS of LAN and WAN connectivity of the two devices. In this way, the update system 170 hastens the completion or convergence of the download from the opposing ends.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the update system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the update system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the update system 170, and/or the autonomous driving module(s) 160 can be operatively connected to communicate with the various vehicle systems 140 and/or individual components thereof. For example, returning to FIG. 1, the processor(s) 110, the update system 170, and/or the autonomous driving module(s) 160 can be in communication to send and/or receive information from the various vehicle systems 140 to control the movement of the vehicle 100. The processor(s) 110, the update system 170, and/or the autonomous driving module(s) 160 may control some or all of the vehicle systems 140.

The processor(s) 110, the update system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the update system 170, and/or the autonomous driving module(s) 160 can control the direction and/or speed of the vehicle 100. The processor(s) 110, the update system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuator(s) 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the update system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An update system for vehicle software comprising:
a processor; and
a memory storing instructions that, when executed by the processor, cause the processor to:
initiate a download from a first point and a second point within a software package by a communication module associated with a vehicle and an alternate device, and the software package is a set having data blocks for completion, and the first point being a starting block and the second point being an end block of the set as opposing ends where the download is coordinated in parallel with the communication module and the alternate device being different sides of the opposing ends, and the download initiated from the starting block and the end block proceeds iteratively from preceding blocks until the download is ceased for the set; and
responsive to a comparison of progress points of the download between the communication module and the alternate device, adapt the download according to the progress points and network connectivity by the communication module to complete the download.

2. The update system of claim 1, wherein the instructions to initiate the download further include instructions to:
command, by the alternate device, the communication module to transfer from the starting block; and control the alternate device to acquire the end block when the communication module is off or disconnected from the network connectivity, wherein the alternate device is a mobile device.

3. The update system of claim 1, wherein the instructions to adapt the download further include instructions to cease by the communication module the download initiated from the starting block while causing the alternate device to continue downloading starting from the end block using a report to the alternate device to estimate completion of the download, wherein the alternate device is a mobile device.

4. The update system of claim 1, wherein the instructions to adapt the download further include instructions to track a gap between the progress points until convergence upon a block position that is off-center to prevent overlap by querying the alternate device to identify progress of the download from the end block, and the alternate device directly downloads from the end block and the communication module directly downloads from the starting block using a sequence for the download.

5. The update system of claim 1, further including instructions to aggregate, by the communication module, the download from the starting block and the end block using a protocol with a window size associated with the data blocks.

6. The update system of claim 1, wherein the data blocks have a signature associated with the communication module for authentication.

7. The update system of claim 1, wherein the instructions to initiate the download further include instructions to download the software package by a data communication module (DCM) of the vehicle and a mobile application of the alternate device to update firmware for a vehicle electronic control unit (ECU) by the DCM.

8. The update system of claim 1, wherein the network connectivity of the vehicle is a wide area network (WAN) and the alternate device is a local area network (LAN).

9. A non-transitory computer-readable medium for updating vehicle software comprising:
instructions that when executed by a processor cause the processor to:
initiate a download from a first point and a second point within a software package by a communication module associated with a vehicle and an alternate device, and the software package is a set having data blocks for completion, and the first point being a starting block and the second point being an end block of the set as opposing ends where the download is coordinated in parallel with the communication module and the alternate device being different sides of the opposing ends, and the download initiated from the starting block and the end block proceeds iteratively from preceding blocks until the download is ceased for the set; and
responsive to a comparison of progress points of the download between the communication module and the alternate device, adapt the download according to the progress points and network connectivity by the communication module to complete the download.

10. The non-transitory computer-readable medium of claim 9, wherein the instructions to initiate the download further include instructions to:
command, by the alternate device, the communication module to transfer from the starting block; and
control the alternate device to acquire the end block when the communication module is off or disconnected from the network connectivity, wherein the alternate device is a mobile device.

11. The non-transitory computer-readable medium of claim 9, wherein the instructions to adapt the download further include instructions to cease by the communication module the download initiated from the starting block while causing the alternate device to continue downloading starting from the end block using a report to the alternate device to estimate completion of the download, wherein the alternate device is a mobile device.

12. The non-transitory computer-readable medium of claim 9, further including instructions that when executed by the processor cause the processor to aggregate, by the communication module, the download from the starting block and the end block using a protocol with a window size associated with the data blocks.

13. A method, comprising:
initiating a download from a first point and a second point within a software package by a communication module associated with a vehicle and an alternate device, and the software package is a set having data blocks for completion, and the first point being a starting block and the second point being an end block of the set as opposing ends where the download is coordinated in parallel with the communication module and the alternate device being different sides of the opposing ends, and the download initiated from the starting block and the end block proceeds iteratively from preceding blocks until the download is ceased for the set; and
responsive to comparing progress points of the download between the communication module and the alternate device, adapting the download according to the progress points and network connectivity by the communication module to complete the download.

14. The method of claim 13, wherein initiating the download further includes:
commanding, by the alternate device, the communication module to transfer from the starting block; and
controlling the alternate device to acquire the end block when the communication module is off or disconnected from the network connectivity, wherein the alternate device is a mobile device.

15. The method of claim 13, wherein adapting the download further includes ceasing by the communication module the download initiated from the starting block while causing the alternate device to continue downloading starting from the end block using a report to the alternate device to estimate completion of the download, wherein the alternate device is a mobile device.

16. The method of claim 13, wherein adapting the download further includes tracking a gap between the progress points until convergence upon a block position that is off-center to prevent overlap by querying the alternate device to identify progress of the download from the end block, and the alternate device directly downloads from the end block and the communication module directly downloads from the starting block using a sequence for the download.

17. The method of claim 13, further comprising:
aggregating, by the communication module, the download from the starting block and the end block using a protocol with a window size associated with the data blocks.

18. The method of claim 13, wherein the data blocks have a signature associated with the communication module for authentication.

19. The method of claim 13, wherein initiating the download further includes downloading the software package by a data communication module (DCM) of the vehicle and a mobile application of the alternate device to update firmware for a vehicle electronic control unit (ECU) by the DCM.

20. The method of claim 13, wherein the network connectivity of the vehicle is a wide area network (WAN) and the alternate device is a local area network (LAN).

\* \* \* \* \*